United States Patent [19]
Saul et al.

[15] 3,681,335
[45] Aug. 1, 1972

[54] SUPPRESSION OF TRIS(ALKYLAMINO)-S-TRIAZINE FORMATION IN THE PRODUCTION OF CHLORO-BIS(ALKYLAMINO)-S-TRIAZINES THROUGH ADJUSTMENT OF PH

[72] Inventors: George A. Saul; Robert J. Eckert, Jr., both of Mobile, Ala.

[73] Assignee: Ciba-Geigy Corporation, Ardsley, N.Y.

[22] Filed: Dec. 30, 1970

[21] Appl. No.: 102,737

[52] U.S. Cl..............................260/249.8, 260/249.5
[51] Int. Cl. ............................................C07d 55/20
[58] Field of Search....................................260/249.8

[56] References Cited

UNITED STATES PATENTS 3,590,040   6/1971   Ferguson et al. ..........260/249.8

*Primary Examiner*—John M. Ford
*Attorney*—Karl F. Jorda and Frederick H. Rabin

[57] ABSTRACT

The known commercial method of producing herbicidal chloro-bis(alkylamino)-s-triazines involves the use of cyanuric chloride as a starting material and the step-wise replacement of two chlorine atoms therefrom with alkylamino groups. One of the by-products obtained is a tris(alkylamino)-s-triazine, which is formed by replacement of the third chlorine atom in cyanuric chloride. A method for suppressing the formation of tris(alkylamino)-s-triazines comprises the steps of (1) lowering the pH of the reaction mixture to about 5.0 to 9.0 immediately after the chlorobis(alkylamino)-s-triazine reaction is complete, thus solublizing and rendering inactive any excess alkylamine reactant, and optionally (2) restoring the pH to about 11.0 to 12.5 immediately prior to recovery of the product in order to facilitate its filtration and separation.

8 Claims, 1 Drawing Figure

SUPPRESSION OF TRIS(ALKYLAMINO)-S-TRIAZINE FORMATION IN THE PRODUCTION OF CHLORO-BIS(ALKYLAMINO)-S-TRIAZINES THROUGH ADJUSTMENT OF PH

FIELD OF THE INVENTION

The present invention relates to an improved procedure for the preparation of chloro-bis(alkylamino)-s-triazines. In particular, it provides a method for the substantial reduction or elimination of tris(alkylamino)-s-triazines which are formed in small, but often significant, amounts as by-products in the commercial preparation of chloro-bis(alkylamino)-s-triazines.

BACKGROUND OF THE INVENTION

Chloro-bis(alkylamino)s-triazine compounds having the following structure

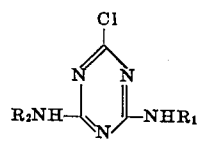

in which $R_1$ and $R_2$ independently represent lower alkyl, inhibit the growth of plants and are widely used as herbicides. The lower alkyl groups denoted by $R_1$ and $R_2$ are specifically those aliphatic and cycloaliphatic radicals of the formula $C_nH_{2n+1}$, where $n$ designates integer of less than 5; thus, they include methyl, ethyl, isopropyl, cyclopropyl, n-butyl, sec-butyl and tert-butyl. Especially valuable as herbicides are atrazine (2-chloro-4-ethylamino-6-isopropylamino-s-triazine), simazine (2-chloro-4,6-bis(ethylamino)-s-triazine), and propazine (2-chloro-4,6-bis(isopropylamino)-s-triazine). These compounds are employed both as selective herbicides for weed control among cultivated plants and as soil sterilents for the total elimination of undesired plant growth. Further details with respect to these and other chloro-bis(alkylamino)-s-triazines are set forth in U.S. Pat. No. 2,891,855.

These chloro-bis(alkylamino)-s-triazines are normally prepared from cyanuric chloride by stepwise substitution of two chlorine atoms by alkylamino groups. The first reaction proceeds according to the general scheme:

(I) 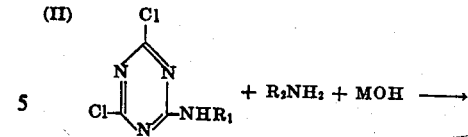

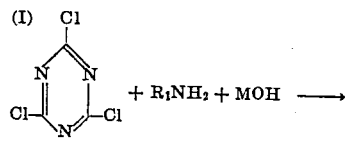

where M represents an alkali metal. The second reaction proceeds according to the scheme:

(II) 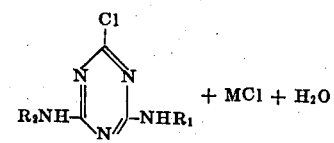

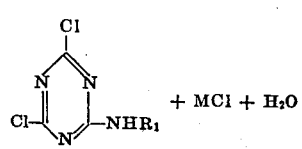

In the commercial preparation of atrazine, for example, cyanuric chloride is first reacted with isopropylamine and an alkali metal hydroxide, such as aqueous sodium hydroxide, to yield 2,4-dichloro-6-isopropylamino-s-triazine according to the following reaction:

(III) 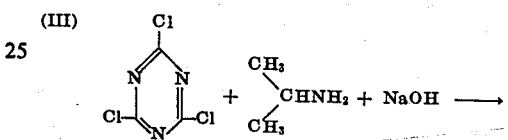

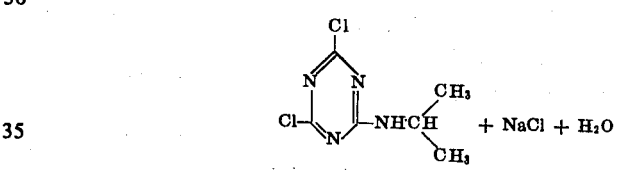

In this reaction substantially equimolar amounts of cyanuric chloride and isopropylamine are used, and the temperature is controlled within the range of from about 5° to 20° C. by means of refrigeration or the addition of ice. The 2,4-dichloro-6-isopropylamino-s-triazine intermediate is then reacted with ethylamine and additional sodium hydroxide to obtain the product, 2-chloro-4-ethylamino-6-isopropylamino-s-triazine, according to the following reaction scheme:

(IV) 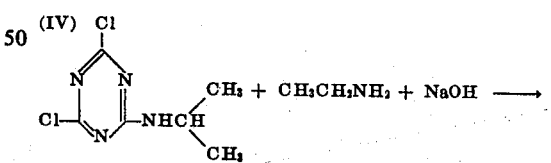

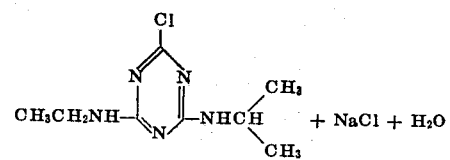

The temperature of this reaction is controlled in the range of about 40° to 65° C., preferably between 50° C. and 60° C. In this second reaction, a 15 percent excess of sodium hydroxide and a 1 to 5 percent excess of ethylamine, over their equimolar amounts, are used. The excess sodium hydroxide is for the purpose of maintaining a strongly alkaline medium, i.e., a pH at a level of from about 10.5 to about 12.5, preferably about 11.5 to 12. The excess ethylamine is used to insure that all of the 2,4-dichloro-6-isopropylamino-s-triazine is reacted. This dichloro compound is irritating to the skin; atrazine which is contaminated with more than 0.5 percent of this dichloro compound is not acceptable. The excess amount of ethylamine, plus the fact that reaction (IV) proceeds at a rapid rate, insures that none of this dichloro compound contaminates the final product.

In commercial practice, chloro-bis(alkylamino)-s-triazines such as 2-chloro-4-ethylamino-6-isopropylamino-s-triazine, are prepared according to two broad general methods. The first is a batch process in which both of the foregoing reactions take place in a single vessel; i.e., the cyanuric chloride is first converted to the dichloro-alkylamino-s-triazine intermediate and, after this reaction is complete, the intermediate is then converted to the chloro-bis(alkylamino) product. The second method is a continuous process in which the first reaction proceeds in one vessel and the intermediate product is transferred to a second vessel for the second reaction. Reaction conditions, such as temperature, pressure, and pH control, and the solvents used vary widely according to which method of preparation is being used. However, the basic chemical reactions and products remain the same.

In the second reaction, i.e., the conversion of the dichloro-alkylamino-s-triazine to the chloro-bis (alkylamino)-s-triazine, one of the by-products is a tris (alkylamino)-s-triazine, which forms from the reaction of the chloro-bis(alkylamino)-s-triazine product with an additional molecule of the alkylamine. Thus, in the preparation of atrazine, illustrated above, small amounts of 2,4-bis(ethylamino)-6-isopropylamino-s-triazine are formed by the replacement of the chlorine atom in the desired product by an additional ethylamino group. 2,4-bis(ethylamino)-6-isopropylamino-s-triazine is a waxy substance and, even in relatively small amounts, interferes seriously with the filtration of the desired product. Furthermore, this by-product impairs the stability and flowability of flowable atrazine formulations.

The tris(alkylamino)-s-triazine by-product can be formed in two ways. First, it may be formed in small amounts during the second reaction in competition with additional 2-chloro-bis(alkylamino)-s-triazine product; some of the ethylamine will react with the already formed product rather than reacting with the dichloro-alkylamino-s-triazine. Fortunately, the conversion of chloro-bis (alkylamino)-s-triazines to tris(alkylamino)-s-triazines proceeds at a considerably slower rate than the conversion of dichloro-alkylamino-s-triazines to chloro-bis(alkylamino)-s-triazines. Thus, by proper and careful limitation of reaction times, temperature and pressure — and by having only a very slight molar excess of alkylamine, e.g., no more than about 0.1 percent excess — it is possible to obtain a final product in which the tris(alkylamino)-s-triazine content is acceptable. In actual commercial practice, however, it is not always feasible to control the reaction conditions and the amount of alkylamine excess to the close degree necessary to attain acceptable levels of tris(alkylamino)-s-triazine formation. Thus, in order to insure that all of the dichloro-alkylamino-s-triazine is reacted, one must, in practice, use at least a 1 percent, and preferably a 2 to 5 percent, molar excess of alkylamine. In commercial practice, an excess of about 3 percent is used. The second and more significant way in which the tris (alkylamino)-s-triazine by-product is formed occurs after all of the dichloro-alkylamino-s-triazine has been converted to the chloro-bis(alkylamino)-s-triazine product. The excess alkylamine reacts with the product to form the tris(alkylamino) by-product.

In the preparation of atrazine, after the replacement of the second chlorine atom with the ethylamino group is complete, one obtains a slurry containing, inter alia, the desired product, unreacted ethylamine, the organic solvent for the cyanuric chloride starting material, sodium hydroxide, and small amounts of 2,4-bis(ethylamino)-6-isopropylamino-s-triazine as a by-product. In practice, this slurry is transferred to a holding tank from which the solvent is removed by distillation. The desired product is then recovered by filtration. In the slurry tank and in subsequent high-temperature distillation, the 2-chloro-4-ethylamino-6-isopropylamino-s-triazine product and the unreacted ethylamine react to form additional tris(alkylamino) by-product, the amount formed being a function of the contact time, pH and amine excess. If this additional contact time at strongly alkaline pH could be eliminated, the amount of tris(alkylamino) by-product formed would probably be at acceptably low levels. However, because in actual practice, the stripping and filtration process requires a length of time in excess of 30 minutes, it would be desirable to remove the unreacted ethylamine either in the slurry holding tank or prior to the transfer of the slurry into said holding tank.

Accordingly, it is an object of this invention to provide in a process for the manufacture of chloro-bis(alkylamino)-s-triazines, a method for rapid deactivation of unreacted alkylamine, thus averting the formation of tris(alkylamino)-s-triazines. It is a further object of this invention to provide a process for preparing chloro-bis(alkylamino)-s-triazines which are substantially free of contamination by tris(alkylamino)-s-triazines.

SUMMARY OF THE INVENTION

In the present invention, strong mineral acid, in sufficient amount to lower the pH to between about 5.0 and 9.0, is added to the reaction slurry. This results in converting the excess unreacted alkylamine into water-soluble salts which no longer react with the chloro-bis(alkylamino)-s-triazine product. After the organic solvent has been removed, the pH may then be readjusted back to a level of about 11.0 to 12.5 immediately before filtration in order to facilitate filtration and washing of the product.

DETAILED DESCRIPTION OF THE INVENTION

Figure 1:
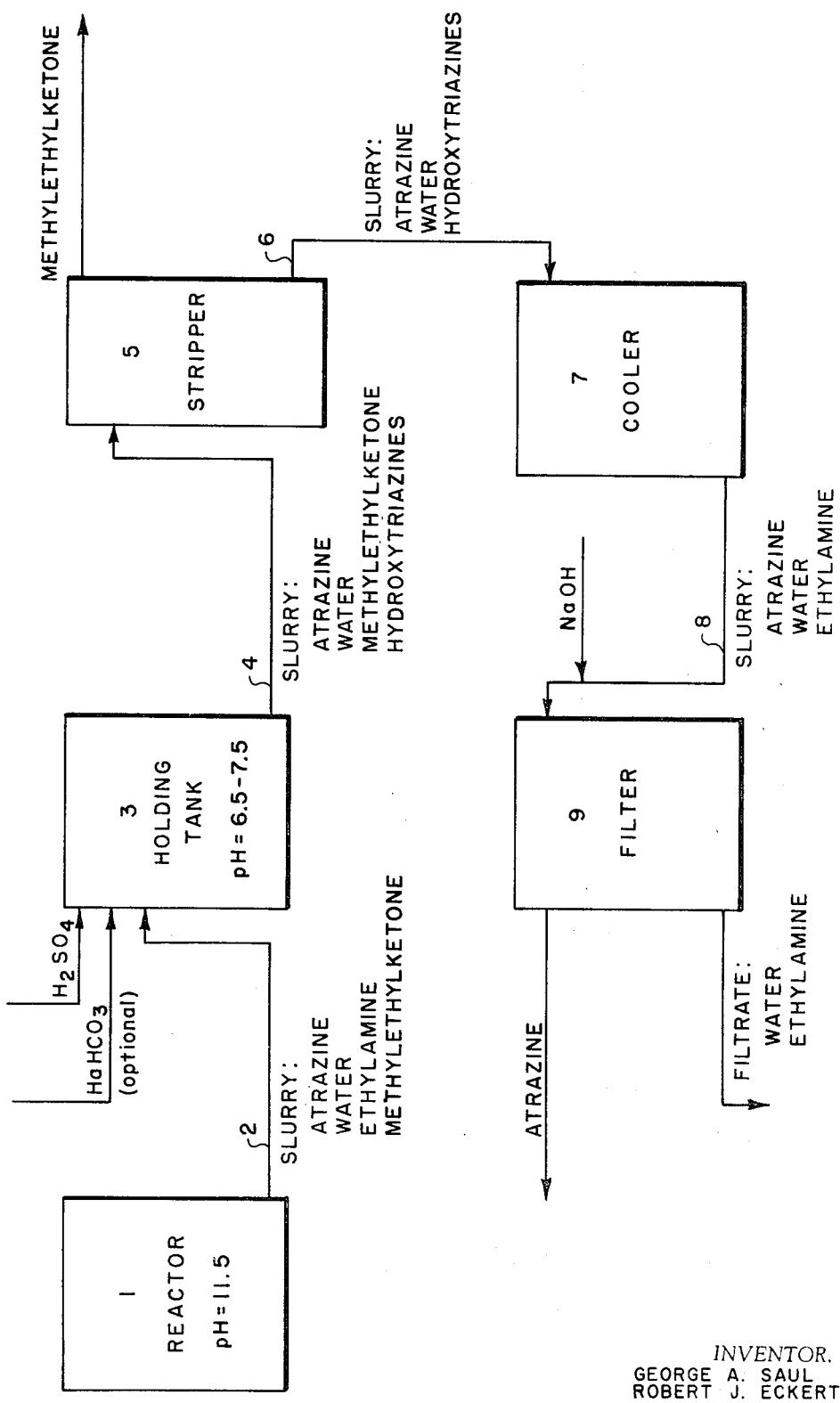

The presence of small amounts of tris (alkylamino)-s-triazines in the final 2-chloro-4,6-bis(alkylamino)-s-triazine products has not heretofore been a serious problem. However, there have recently been developed new solid and flowable formulations of these herbicidal triazines which are characterized by greatly increased ease of handling and application and by improved herbicidal effectiveness. The presence of tris(alkylamino)-s-triazine impurities in these new formulations at levels above about 0.1 percent of the total triazine product causes some difficulties in storage and handling. Accordingly, it is necessary — in order to take advantage of the improvements available by use of these new formulations — to produce 2-chloro-4,6-bis(alkylamino)-s-triazine herbicides which contain no more than about 0.1 percent of tris(alkylamino)-s-triazines. The tris(alkylamino)-s-triazine concentration should be below 0.1 percent and preferably below 0.05 percent based on the weight of total triazines present.

By proper control of the reaction time and conditions during reaction (II) described above, one can obtain a 2-chloro-4,6-bis(alkylamino)-s-triazine product slurry in which the level of tris(alkylamino)-s-triazine impurity is below 0.05 percent and in some cases even non-detectable (i.e., less than 0.01 percent). This product slurry, containing, inter alia, the 2-chloro-4,6-bis(alkylamino)-s-triazine product and the unreacted alkylamine (present because of the 1 to 5 percent excess used), is transferred first to a holding tank, then to a solvent stripping column, and then to a filter on which the final product is separated. While the slurry is in the holding tank, the slow reaction between the desired and the unreacted alkylamine takes place, resulting in the formation of additional tris(alkylamino)-s-triazine. If the slurry holding tank could be eliminated, i.e., if the reaction slurry could proceed from the reactor directly to the filtering and stripping media, the problem of additional tris(alkylamino)-s-triazine formation would be obviated. However, in commercial practice, particularly with batch reactors, this is not feasible. It is therefore necessary to remove or otherwise deactivate (i.e., quench) the unreacted alkylamine as soon as possible after reaction (II) is complete.

The pH of the product slurry is normally between about 11.0 and 12.5. At this pH, the unreacted alkylamine is available to react with the 2-chloro-4,6-bis(alkylamino)-s-triazine product. By lowering the pH, however, to between about 5.0 and 9.0, preferably to between about 6.5 and 7.5, through the addition of a strong mineral acid such as hydrochloric, nitric, sulfuric, etc., one converts the alkylamine to an alkylamino salt soluble in water but no longer available to react with the 2-chloro-4,6-bis(alkylamino)-s-triazine product. Thus, if the unreacted alkylamine is ethylamine and sulfuric acid is added, the following reaction takes place:

(V) $2CH_3CH_2NH_2 + H_2SO_4 \longrightarrow 2CH_3CH_2NH_3^+ + SO_4^-$

Sufficient mineral acid should be added to lower the pH to between about 5.0 and 9.0. A pH of from about 6.5 to about 7.5 is especially convenient since, at that pH level, the excess amine is deactivated and one does not run the attendant risk of acid damage to reactor vessels and equipment (which are constructed for use under strongly alkaline conditions). In order to maintain a slightly alkaline pH, a small amount of a buffer, such as sodium bicarbonate, may be used.

The step of lowering the pH to the above-indicated level should take place as soon as possible after the completion of the reaction in which the second chlorine atom of cyanuric chloride is replaced with an alkylamino group. Preferably, the lowering of the pH should be done within 30 minutes, more preferably, within 10 minutes, after the termination of reaction (II).

After the pH has been adjusted downward, the organic solvent (for the cyanuric chloride starting product) is then removed in the usual manner by distillation. And, lastly, the insoluble 2-chloro-4,6-bis(alkylamino)-s-triazine product is removed from the remaining aqueous slurry by filtration and subsequent washing. Immediately prior to the removal of the product from the aqueous slurry, however, it has been found to be advantageous to raise the pH again to a level of about 11.0 to 12.5, preferably from about 11.5 to 12.0. The reason for this second adjustment in pH is to avoid the presence of other impurities, namely, hydroxytriazines, which are insoluble in the pH range necessary to effect the removal of the excess unreacted alkylamines. By raising the pH to a level of about 11.5 to 12.0, the hydroxytriazines are converted into their soluble alkali metal salts and remain in the filtrate. Raising the pH to this level prior to filtration frees the alkylamine from its acid salt. Only negligible amounts of tris(alkylamino)-s-triazines are formed after this second pH adjustment, however, if filtration and washing take place immediately thereafter.

In the accompanying drawings, FIG. 1 is a diagrammatic flow sheet illustrating a method of practicing this invention in a process for the preparation of atrazine, 2-chloro-4-ethylamino-6-isopropylamino-s-triazine. In reactor 1, atrazine is prepared according to the batch process by step-wise replacement of two chlorine atoms in cyanuric chloride by an isopropylamino group and an ethylamino group. A slurry is obtained, comprising atrazine, water, excess unreacted ethylamine, and methylethylketone (the solvent for the cyanuric chloride). This slurry, which has a pH of about 11.5, is led through a suitable conduit 2 to a holding tank 3. Immediately upon entry of the slurry into the holding tank, a sufficient amount of sulfuric acid is added to achieve and maintain a pH of between about 6.5 and 7.5. If the pH should fall below 6.5, it can be raised by addition of sodium bicarbonate. The adjustment of the pH to this level causes the ethylamine to be converted into an ethylamino salt which is non-reactive to atrazine. At the same time, certain hydroxytriazine compounds which formed in small amounts as by-products in the reactor and which were soluble in water at the higher pH, become insoluble and enter the slurry. From holding tank 3, a slurry comprising atrazine, water, the methylethylketone solvent, and the now insoluble hydroxytriazines is led by a suitable conduit 4 to a stripping tank 5. In this stripping tank, the methylethylketone solvent is removed by methods well-known in the art. From the stripping tank 5, the slurry (which no longer contains methylethylketone) is led via conduit 6 to a cooling tank 7. Leaving the cooling tank, the pH of the slurry is raised to about 11.5 by the addition of aqueous sodium hydroxide. This causes the hydroxytriazines to be converted to their soluble sodium salts, at the same time freeing the ethylamine from its acid salt. Thus, the slurry leaving cooling tank 7 via conduit 8 comprises atrazine, water and ethylamine. The slurry is then immediately passed through filter 9, in which the filtrate comprising water, ethylamine, sodium chloride, other inorganic salts and sodium salts of hydroxytriazines is removed, leaving atrazine as the product.

The following examples are intended to illustrate some of the theory and embodiments of the present invention. The examples therefore are for illustrative purposes only and are not to be construed as limitations.

EXAMPLE 1

Figure 2:
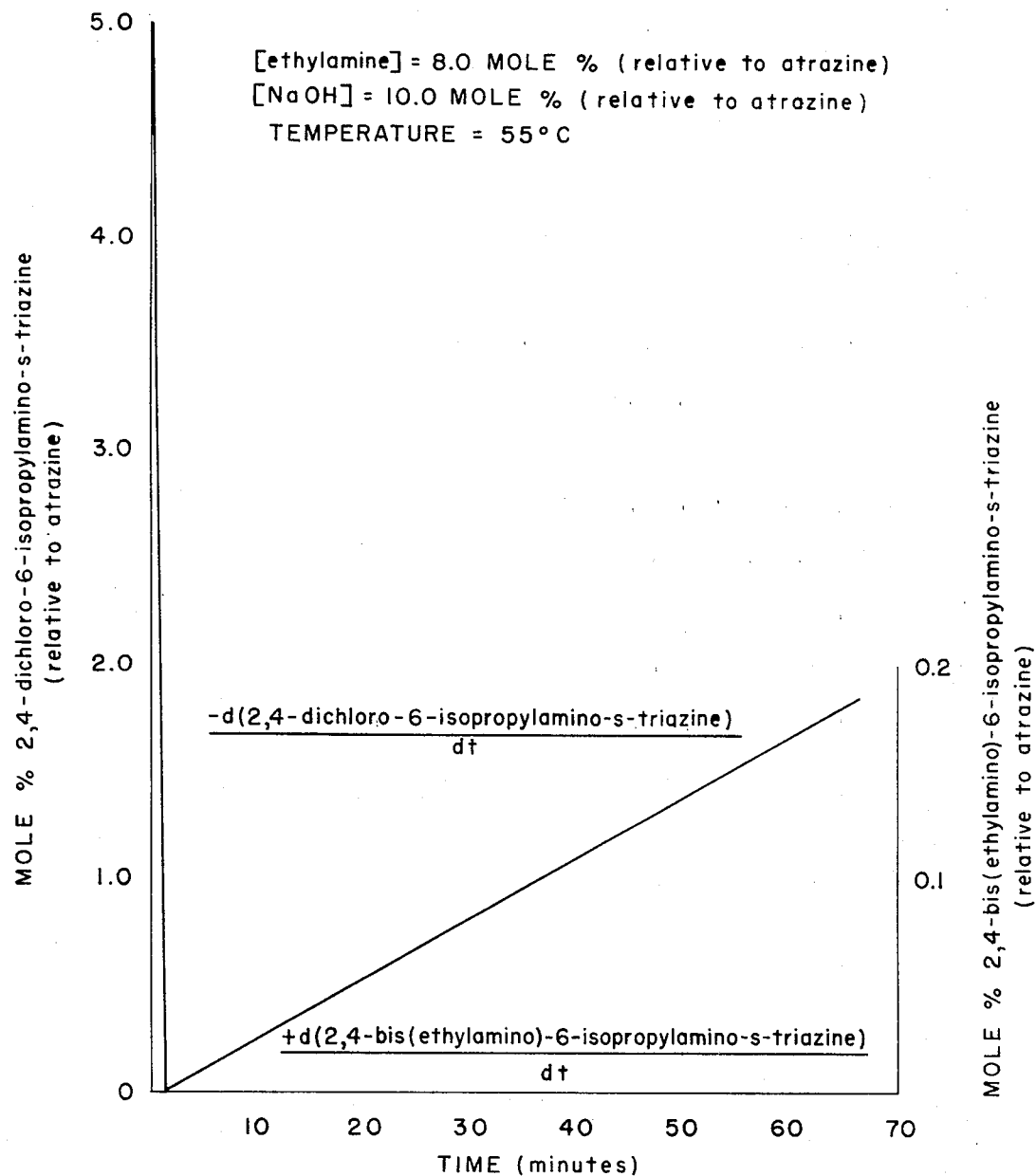

This example illustrates the rates of formation of atrazine (2-chloro-4-ethylamino-6-isopropylamino-s-triazine) and the 2,4-bis(ethylamino)-6-isopropylamino-s-triazine by-product during the reaction of 2,4-dichloro-6-isopropylamino-s-triazine with ethylamine (reaction (IV) described above). To a 250 ml Erlenmeyer flask, thermostated by water bath at 55° C. and equipped with a magnetic stirrer, was charged 102 g. of water, 19.2 g. of sodium chloride, 75.2 g. of methylethylketone, 1.70 g. of 2,4-dichloro-6-isopropylamino-s-triazine (5 percent molar excess relative to a normal atrazine change), 8.9 g. of atrazine, 0.84 g. of ethylamine (8 percent molar excess relative to a normal atrazine change) and 1.33 g. of sodium hydroxide (10 percent excess). The contents of the flask are representative of the contents of the reactor during the second stage of the commercial preparation of atrazine. The amount of atrazine was reduced considerably in order to facilitate sampling and analysis. However, there was a considerable amount of atrazine present in the water/methylethylketone slurry. The disappearance of the 2,4-dichloro-6-isopropylamino-s-triazine and the appearance of the trisamino impurity, 2,4-bis(ethylamino)-6-isopropylamino-s-triazine, were followed by gas chromatographic analysis of the methylethylketone layer. The accompanying FIG. 2 is the plot of the disappearance of the 2,4-dichloro intermediate and the subsequent appearance of the tris (alkylamino) by-product as a function of time. The data indicate that the replacement of the 4-chlorine atom in 2,4-dichloro-6-isopropylamino-s-triazine with an ethylamino group, thus producing atrazine, is substantially complete in less than 2 minutes. The reaction of atrazine with the excess ethylamine and the subsequent formation of 2,4-bis(ethylamino)-6-isopropylamino-s-triazine proceeds at a considerably slower rate. Thus, if the excess ethylamine could be physically removed within, say, about 30 minutes after the atrazine reaction is complete, the amount of 2,4-bis(ethylamino)-6-isopropylamino-s-triazine formed would be below about 0.1 mole percent and thus would be acceptable for most purposes, particularly for formulation purposes. However, since physical removal of the excess ethylamine within this time period is not always feasible, it would be desirable to develop a method of quenching, i.e., deactivating, the ethylamine so as to prevent formation of this tris(alkylamino) by-product.

EXAMPLE 2

To determine the effect of pH adjustment on the formation of 2,4-bis(ethylamino)-6-isopropyl-amino-s-triazine as a by-product in the production of atrazine, various tests were run. Atrazine was produced under laboratory conditions by the usual commercial method of stepwise replacement of two chlorine atoms in cyanuric chloride with isopropylamino and ethylamino groups, respectively. In the second reaction, excess ethylamine in amounts of 1.0, 2.5, and 5.0 percent were used. The solvent used was methylethylketone and the reaction temperature was kept at 50° C. by means of the addition of ice. After the second reaction was complete, the pH of the resultant slurry was immediately adjusted with hydrochloric acid to 8.0, 9.0 or 11.5. The slurry was then held for 20 hours prior to solvent stripping and subsequent filtration. After this 20-hour period, there followed the usual stripping, filtration, washing and drying steps. The percentage of 2,4-bis(ethylamino)-6-isopropylamino-s-triazine in the final dry atrazine cake was then measured. In Table I, the data obtained are recorded, "tris" indicating 2,4-bis(ethylamino)-6-isopropylamino-s-triazine.

TABLE I

| Run | | Mole % Excess $C_2H_5NH_2$ | Quench pH (adjusted with HCl) | pH after 20 hours | % Tris in dry cake |
|---|---|---|---|---|---|
| | A | | 8.0 | 6.7 | 0.01 |
| | B | 5.0 | 9.0 | 7.4 | 0.01 |
| | C | | 11.5 | 9.2 | 2.4 |
| | A | | 8.0 | 6.9 | 0.01 |
| 2 | B | 2.5 | 9.0 | 8.0 | 0.01 |
| | C | | 11.5 | 10.0 | 0.50 |
| | A | | 8.0 | | 0.01 |
| 3 | B | 1.0 | 9.0 | | 0.01 |
| | C | | 11.5 | | 0.01 |

The data indicate that, in Runs 1 and 2 where there is a substantial molar excess of ethylamine, the addition of sufficient strong acid to lower the pH to 9.0 or less suppresses the reaction of the atrazine product with the ethylamine. The amounts of the tris(alkylamino) by-product produced are well within acceptable limits. Where the quench pH is 11.5, however, significant amounts of the tris(alkylamino) by-product are formed. In Run No. 3, where the amount of excess ethylamine is only 1 percent, formation of the tris(alkylamino) by-product even at high pH levels is not a problem. However, as has been pointed out above, it has been found necessary in commercial practice to use at least about a 3 percent molar excess of ethylamine. Therefore, by practicing this invention, close stoichiometry of the alkylamine reactant is not necessary; a "comfortable" excess can be used.

EXAMPLE 3

To determine the effectiveness of a mineral acid quench on a commercial basis, the procedure of this invention was employed on atrazine slurries obtained directly from a commercial atrazine reactor. Atrazine was produced in this reactor by step-wise replacement of two chloride atoms in cyanuric chloride with the appropriate alkylamine radical. A number of samples of the atrazine slurry were subjected to an ethylamine "quench" 5 or 10 minutes after the atrazine was complete. The "quench" was accomplished by adding sufficient sulfuric acid to lower the pH to a specified level. All the samples of atrazine slurry were then allowed to "post-react" further for a period of 20 hours at a constant temperature of 50° C. In some of the quenched samples, 2 percent by weight of sodium bicarbonate was added during this post-reaction time; the purpose of this bicarbonate addition was to assure that the pH remain on the slightly caustic side after eventual removal of the methylethylketone solvent. After a 20-hour post-reaction time, the methylethylketone solvent was removed by distillation and the amount of solvent removed was replaced with an equivalent amount of water. The amount of ethylamine in the removed solvent and the pH of the remaining atrazine slurry was then observed. Following this step, the atrazine slurry was filtered, and the resultant atrazine cake was washed and dried in the usual manner. The amounts of 2,4-bis(ethylamino)-6-isopropylamino-s-triazine and the hydroxytriazine by-products were then observed, as well as the amounts of any unreacted 2,4-dichloro-6-isopropylamino-s-triazine. The data obtained are reported in Table II, "-tris" standing for 2,4-bis(ethylamino)-6-isopropylamino-s-triazine, "dichloro" standing for 2,4-dichloro-6-isopropylamino-s-triazine, "hydroxy" standing for the various hydroxytriazine impurities, and "N.D." indicating a non-detectable amount.

TABLE III

| Triazine Herbicide Product | First Alkylamine (Reaction I) | Second Alkylamine (Reaction II) |
|---|---|---|
| 2-chloro-4,6-bis(isopropylamino)-s-triazine (propazine) | isopropylamine | isopropylamine |
| 2-chloro-4,6-bis(ethylamino)-s-triazine (simazine) | ethylamine | ethylamine |
| 2-chloro-4-sec-butylamino-6-ethylamino-s-triazine | sec-butylamine | ethylamine |
| 2-chloro-4-tert-butylamino-6-ethylamino-s-triazine | tert-butylamine | ethylamine |

Immediately after reaction (II) is complete, a sufficient amount of sulfuric acid is added to lower the pH of the product slurry to a level between 6.5 and 7.5. The excess ethylamine or isopropylamine is thereby deactivated; i.e., it is no longer capable of reacting with the chloro-bis(alkylamino)-s-triazine product to form a

TABLE II

| Run | Peak reactor temp., °C. | Slurry pH Before quench | Slurry pH After quench | NaHCO$_3$ added, g. | Percent C$_2$H$_5$NH$_2$ in methyl ethylketone solvent ND<.001% | Slurry pH after distillation | Percent tris ND<.05% | Percent dichloro ND<.01% | Percent hydroxy |
|---|---|---|---|---|---|---|---|---|---|
| 4A | 60 | 11.5 | 11.5 | 0 | 0.05 | 11.7 | 0.23 | ND | 0.04 |
| 4B |  |  | 7.5 | 0 | ND | 6.4 | ND | ND | 0.50 |
| 4C |  |  | 7.5 | 0.02 | 0.05 | 9.0 | ND | ND | 0.40 |
| 5A | 60 | 11.5 | 11.5 | 0 | 0.01 | 11.9 | ND | ND | 0.03 |
| 5B |  |  | 7.5 | 0 | ND | 6.7 | ND | ND | 0.19 |
| 5C |  |  | 7.5 | 0.02 | 0.015 | 9.0 | ND | ND | 0.24 |
| 6A | 55 | 11.5 | 11.5 | 0 | 0.12 | 11.7 | 2.90 | ND | 0.18 |
| 6B |  |  | 7.5 | 0 | ND | 5.5 | ND | ND | 0.52 |
| 6C |  |  | 7.5 | 0.016 | 0.098 | 8.3 | ND | ND | 0.65 |
| 7A | 53 | 12.0 | 12.0 | 0 | 0.37 | 12.0 | 13.7 | ND | 0.71 |
| 7B |  |  | 7.5 | 0 | Trace | 6.1 | ND | ND | 0.71 |
| 7C |  |  | 7.5 | 0.016 | 0.13 | 7.4 | ND | 0.01 | 0.56 |
| 8A | 58 | 11.7 | 11.7 | 0 | 0.07 | 12.0 | 0.44 | ND | 0.07 |
| 8B |  |  | 7.5 | 0 | 0.001 | 7.4 | ND | ND | 0.07 |
| 8C |  |  | 7.5 | 0.016 | 0.060 | 9.2 | ND | ND | 0.47 |

The data clearly show that the B and C series, in which the pH was initially adjusted to 7.5, show considerably less "tris" formation than the "A" series in which no pH adjustment was made. Furthermore, by comparing the B and C series, the latter of which represents the addition of a small amount of sodium bicarbonate in order to keep the atrazine slurry at the slightly alkaline level, it can be seen that the level of "-tris" formation remains quite low.

EXAMPLE 4

The process of this invention is also applicable to triazine herbicides other than atrazine, which are produced by the step-wise replacement of two chlorine atoms in cyanuric chloride by alkylamino groups. Examples of these other triazine herbicides and their method of manufacture are listed in Table III, which indicates the order of replacement of the two chlorine atoms in cyanuric chloride according to reactions (I) and (II) described above. In all cases, reaction (II) employs alkylamine in an excess of about 3 percent.

tris(alkylamino)-s-triazine. The product slurry is maintained at this pH level until just prior to filtration, when it can be raised to between about 11.0 and 12.5 in order to facilitate filtration of the product.

We claim:

1. In a process for preparing chloro-bis (alkylamino)-s-triazines in a strongly alkaline medium by means of the step-wise replacement of two chlorine atoms of cyanuric chloride with alkylamino groups and in which the second alkylamine is present in a molar excess of at least 1 percent, the method of suppressing the formation of tris(alkylamino)-s-triazines which comprises adjusting, after the second chlorine atom has been replaced with an alkylamino group, the pH of the medium to a range of between about 5.0 and 9.0 and maintaining the pH within said range until separation and recovery of the chloro-bis(alkylamino)-s-triazine.

2. The method of claim 1 which includes the additional step of raising the pH to from about 11.0 to 12.5 immediately prior to separation and recovery of the chloro-bis(alkylamino)-s-triazine.

3. The method of claim 1 in which the pH is adjusted to and maintained within the range of between about 6.5 and 7.5.

4. The method of claim 1 in which the pH is adjusted by means of the addition of strong mineral acid.

5. In a process for preparing 2-chloro-4-ethylamino-6-isopropylamino-S-triazine in a medium having a pH of from about 11.0 to 12.5 by means of the step-wise replacement of two chlorine atoms of cyanuric chloride with an isopropylamino group and an ethylamino group and in which the ethylamine is present in a molar excess of from about 1 to about 5 percent, the method of suppressing the formation of 2,4-bis(ethylamino)-6-isopropylamino-s-triazine which comprises adjusting, after the second chlorine atom has been replaced with an ethylamino group, the pH of the medium to a range of between about 5.0 and 9.0 and maintaining the pH within this range until separation and recovery of the atrazine.

6. The method of claim 5 in which the pH is adjusted to and maintained within the range of between about 6.5 and 7.5.

7. The method of claim 5 which includes the additional step of readjusting the pH to a range of between about 11.0 and 12.5 immediately prior to the separation and recovery of atrazine.

8. The method of claim 5 in which the pH is adjusted by means of the addition of sulfuric acid.

* * * * *